(12) United States Patent
Gaglione

(10) Patent No.: US 6,229,108 B1
(45) Date of Patent: May 8, 2001

(54) APPARATUS FOR DISTRIBUTING OBJECTS WITH A PARTICULAR LONGITUDINAL ORIENTATION

(75) Inventor: Patrick Gaglione, Vaires sur Marne (FR)

(73) Assignee: Societe d'Exploitation des Machines Dubuit, Noisy le Grand (FR)

( * ) Notice: Subject to any disclaimer, the term of this patent is extended or adjusted under 35 U.S.C. 154(b) by 0 days.

(21) Appl. No.: 09/330,099

(22) Filed: Jun. 11, 1999

(30) Foreign Application Priority Data

Jun. 12, 1998 (FR) .................................................. 98 07414

(51) Int. Cl.⁷ .............................. B07C 5/00; B65G 47/24; B65G 43/08
(52) U.S. Cl. ........................... 209/524; 198/394; 198/395
(58) Field of Search ..................................... 198/395, 394, 198/396, 397, 398, 400, 401; 209/522, 523, 524, 529, 540, 542, 545, 657, 699

(56) References Cited

U.S. PATENT DOCUMENTS

| | | |
|---|---|---|
| 3,212,668 | 10/1965 | Gleason et al. . |
| 3,710,922 * | 1/1973 | Lamphere et al. ............... 198/399 X |
| 3,776,346 | 12/1973 | Dubuit . |
| 4,324,336 * | 4/1982 | Sandbank ......................... 209/657 X |
| 4,574,939 | 3/1986 | Dubuit . |
| 4,699,261 * | 10/1987 | Nesin ............................... 198/398 X |
| 4,915,237 * | 4/1990 | Chang et al. ....................... 209/524 |
| 5,065,852 * | 11/1991 | Marti ............................... 198/392 X |
| 5,141,110 * | 8/1992 | Trischan et al. ..................... 209/524 |
| 5,260,576 * | 11/1993 | Sommer, Jr. et al. ........... 209/522 X |
| 5,423,431 * | 6/1995 | Westin ............................. 209/657 X |
| 5,641,072 * | 6/1997 | Otake ................................... 209/524 |

FOREIGN PATENT DOCUMENTS

| | | |
|---|---|---|
| 19 04 967 | 8/1970 | (DE) . |
| 1 244 294 | 8/1971 | (GB) . |
| 1 403 182 | 8/1975 | (GB) . |

* cited by examiner

Primary Examiner—Christopher P. Ellis
Assistant Examiner—Gene O. Crawford
(74) Attorney, Agent, or Firm—Young & Thompson

(57) ABSTRACT

Apparatus for distributing objects to be longitudinally oriented one particular way round includes a selective turning device upstream of a take-off conveyor. A retractable selection conveyor is placed between the selective turning device and the take-off conveyor. Applications include oriented distribution of containers which have a neck.

10 Claims, 4 Drawing Sheets

APPARATUS FOR DISTRIBUTING OBJECTS WITH A PARTICULAR LONGITUDINAL ORIENTATION

BACKGROUND OF THE INVENTION

1. Field of the Invention

The present invention is generally concerned with automatic distribution apparatus used to orient objects of any kind and distribute them to a workstation of any kind.

It is more particularly directed, although not necessarily exclusively so, to the situation in which the objects are hollow bodies, for example containers which have a neck, i.e. bottles.

Bottles must necessarily be offered up to a workstation for filling them with the neck at the top.

2. Description of the Prior Art

The distribution apparatus usually employed to impart this orientation to them includes a feed hopper adapted to receive the objects to be distributed loose, at least one take-up corridor that dips into the feed hopper, a longitudinal take-up conveyor in the take-up corridor adapted to drive the objects, a selective turning device adapted to allow the objects to pass through it when they arrive a first way round and to turn them if they arrive a second, opposite way round, and a take-off conveyor fed by the selective turning device.

In practice there is a plurality of take-up corridors side-by-side and each has a take-up conveyor, a selective turning device and a take-off conveyor.

In practice, when the objects to be distributed are bottles, the neck is toward the rear on the take-off conveyors.

Distribution apparatus of the above type is described in particular in U.S. Pat. No. 3,776,346.

Distribution apparatus of the above type, in which the take-off conveyors are in practice simple chutes, has proved satisfactory and may continue to do so.

It nevertheless has the disadvantage of requiring an operative to be present to monitor its operation.

This is because various incidents can disrupt its operation.

For example, the selective turning device at the upstream end of a take-off conveyor may develop a fault as a result of which a bottle on that take-off conveyor has the neck at the front.

If the objects to be distributed are synthetic material bottles, a bottle that has been crushed as a result of the handling to which it has been exposed may have a sufficiently large transverse dimension to become jammed in the take-off conveyor, causing congestion upstream thereof.

To overcome this drawback, the previously mentioned U.S. Pat. No. 3,776,346 provides each take-off conveyor with an individual sensor responsive to the prolonged presence of an object at its location and adapted to stop the corresponding take-up conveyor accordingly.

Apart from the fact that this entails providing each take-up conveyor with individual clutch means, an object can become jammed in the take-off conveyor as soon as it enters it and therefore before reaching the sensor with which the take-off conveyor is provided, which renders the sensor ineffective.

Although such incidents are relatively infrequent in practice, each incident requires the intervention of the operative responsible for monitoring the system, to eliminate the defective object and/or to restart all or part of the distribution apparatus. Despite the relative infrequency with which such intervention is required, the operator necessarily has to be present at all times.

U.S. Pat. No. 4,574,939 provides each take-off conveyor with a sensor adapted to stop an object which is the wrong way round.

As previously, however, this type of incident still requires the intervention of an operative to remove the object that is the wrong way round.

A general aim of the present invention is an arrangement for automatically dealing with an object before it enters a take-off conveyor and which has other advantages.

SUMMARY OF THE INVENTION

The present invention consists in apparatus for distributing objects to be oriented longitudinally one way round, including a feed hopper adapted to receive the objects to be distributed loose, at least one take-up corridor that dips into the feed hopper, a longitudinal take-up conveyor in the take-up corridor adapted to drive the objects, a selective turning device adapted to allow the objects to pass through it when they are a first way round and to turn them when they are a second, opposite way round, a take-off conveyor fed by the selective turning device and a retractable selection conveyor between the selective turning device and the take-off conveyor.

The selection conveyor preferably moves between a service position in which it is continuous with the take-off conveyor and an ejection position in which it interrupts feeding of the take-off conveyor.

The selection conveyor preferably intervenes automatically when an object is the wrong way round, i.e. has the longitudinal orientation opposite that required.

For example, actuator means for moving the selection conveyor from its service position to its ejection position are controlled by two longitudinally spaced sensors between the selective turning device and the take-off conveyor, both of which are responsive to the movement of the objects to be distributed, one of which is substantially on an axis of displacement of the objects and the other of which is spaced from that axis.

The two sensors can therefore sense the orientation of passing objects vertically aligned with them.

When the objects are bottles, for example, they can sense whether each bottle has the bottom or the neck at the front.

Finally, the drive means of the selection conveyor provided in accordance with the invention are preferably also under the control of a sensor vertically aligned with the take-off conveyor.

Accordingly, if there are excess objects on the take-off conveyor because of congestion, the selection conveyor of the invention automatically moves to its ejection position which, by returning objects reaching it to the feed hopper, avoids the need to stop the corresponding take-up conveyor.

It is therefore advantageously possible, if required, to dispense with individual clutch means for the take-up conveyors, which is beneficial in terms of cost.

The features and advantages of the invention will emerge from the following description given by way of example and with reference to the accompanying diagrammatic drawings.

DETAILED DESCRIPTION OF THE PREFERRED EMBODIMENT

The figures show, by way of example, application of the invention to the situation in which the objects 10 to be distributed are containers which have a neck, i.e. bottles.

The objects 10 therefore each have a neck 11 and a bottom 12.

The objects 10 are made of a synthetic material, for example.

Figure 1:
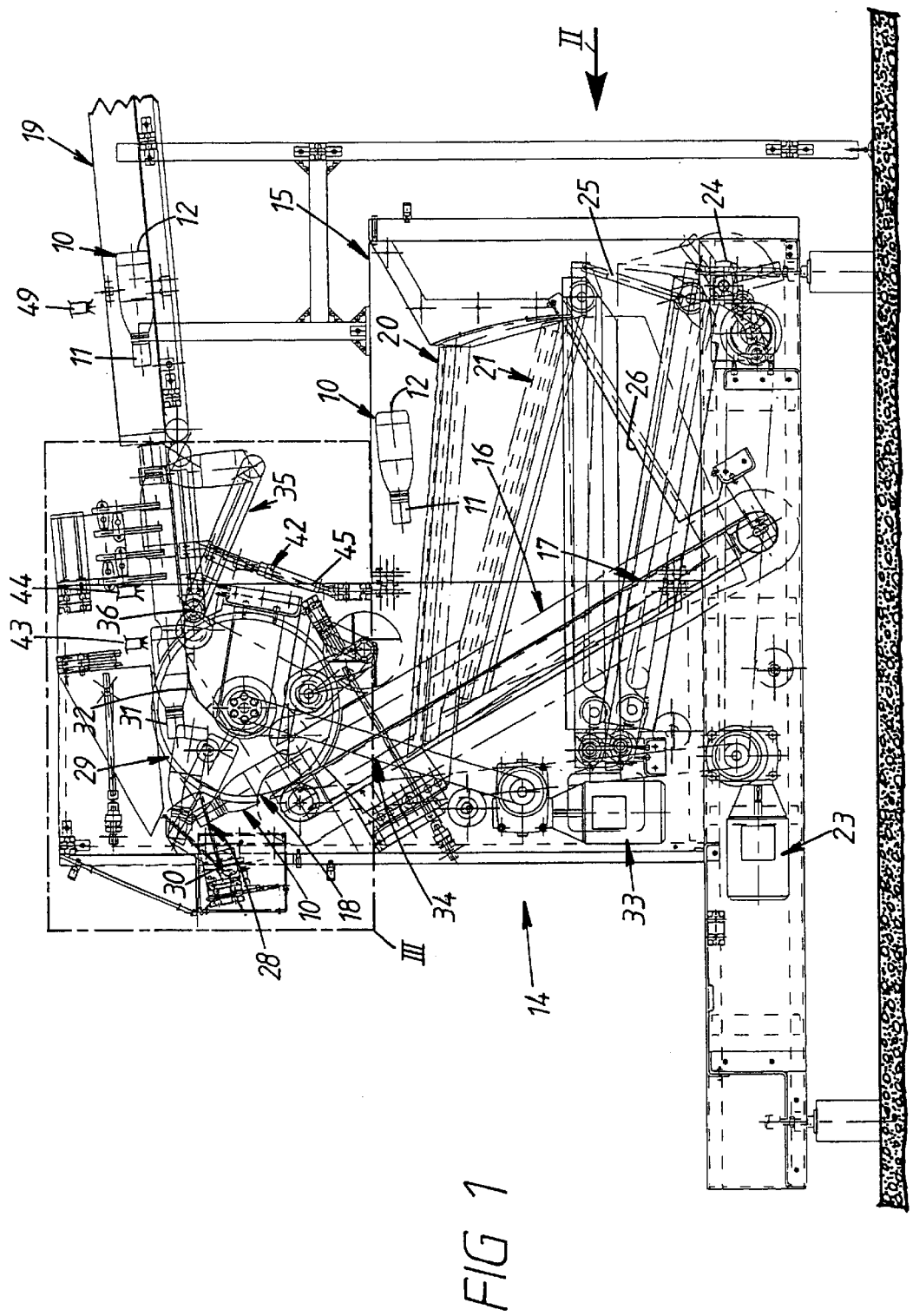
FIG. 1 is a side elevation view of distribution apparatus in accordance with the invention.

In practice, in the embodiment shown, and as can be seen for one of them in the top righthand part of FIG. 1, the objects 10 must be delivered to a workstation of any kind, not shown, with the bottom 12 at the front.

In a manner that is known per se, distribution apparatus 14 used for this purpose includes a feed hopper 15 adapted to receive objects 10 to be distributed loose, at least one take-up corridor 16 that dips into the feed hopper 15, a longitudinal take-up conveyor 17 in the take-up corridor adapted to drive the objects 10, a selective turning device 18 adapted to allow the objects to pass through it when they are a first way round and to turn them when they are a second, opposite way round, and a take-off conveyor 19 fed by the selective turning device 18.

In the embodiment shown, the distribution apparatus 14 includes a plurality of take-up corridors 16 side-by-side and operating in parallel, each including a take-up conveyor 17, a selective turning device 18 and a take-off conveyor 19.

Figure 2:
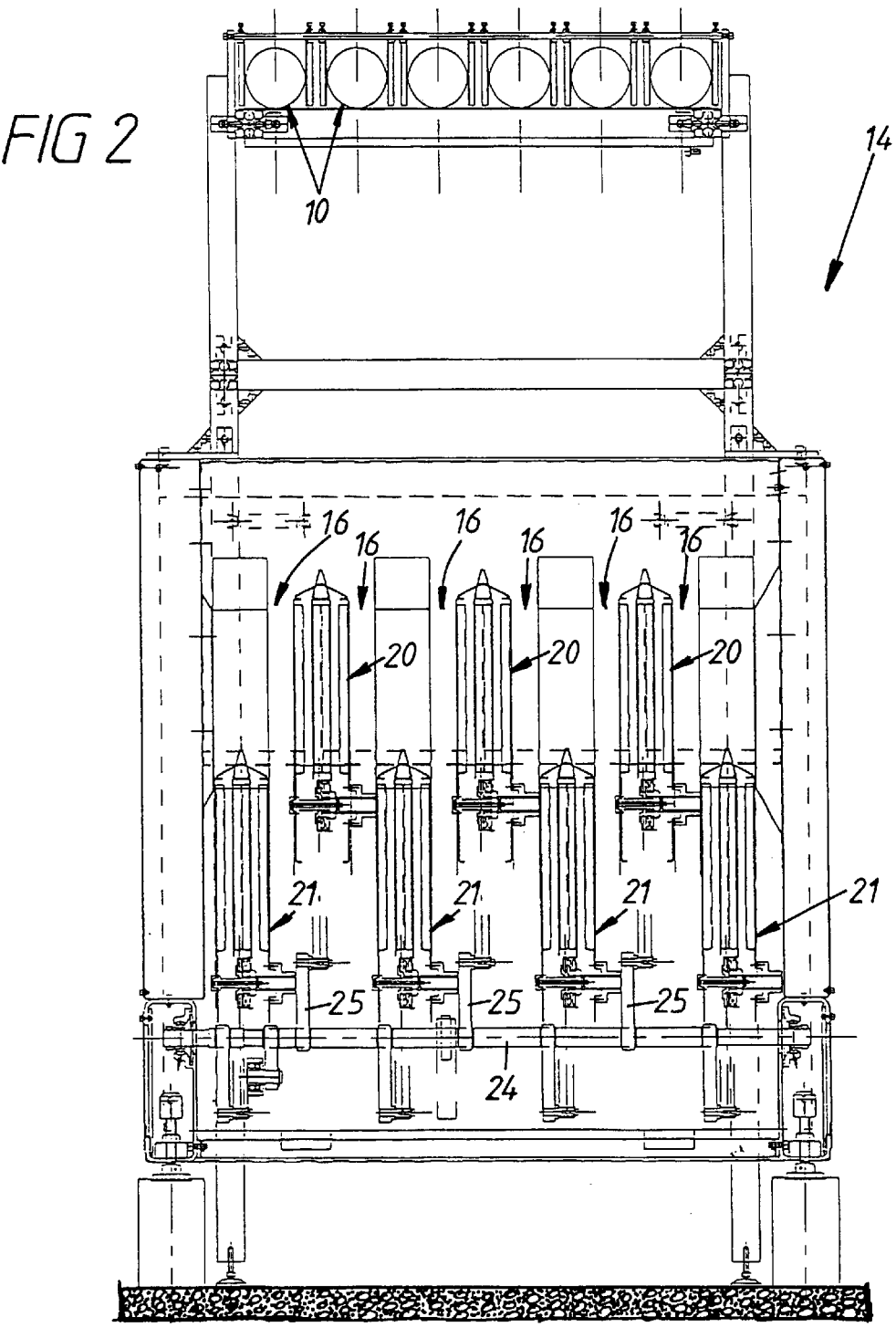
FIG. 2 is a front view of the apparatus as seen in the direction of the arrow II in FIG. 1.
Figure 3:
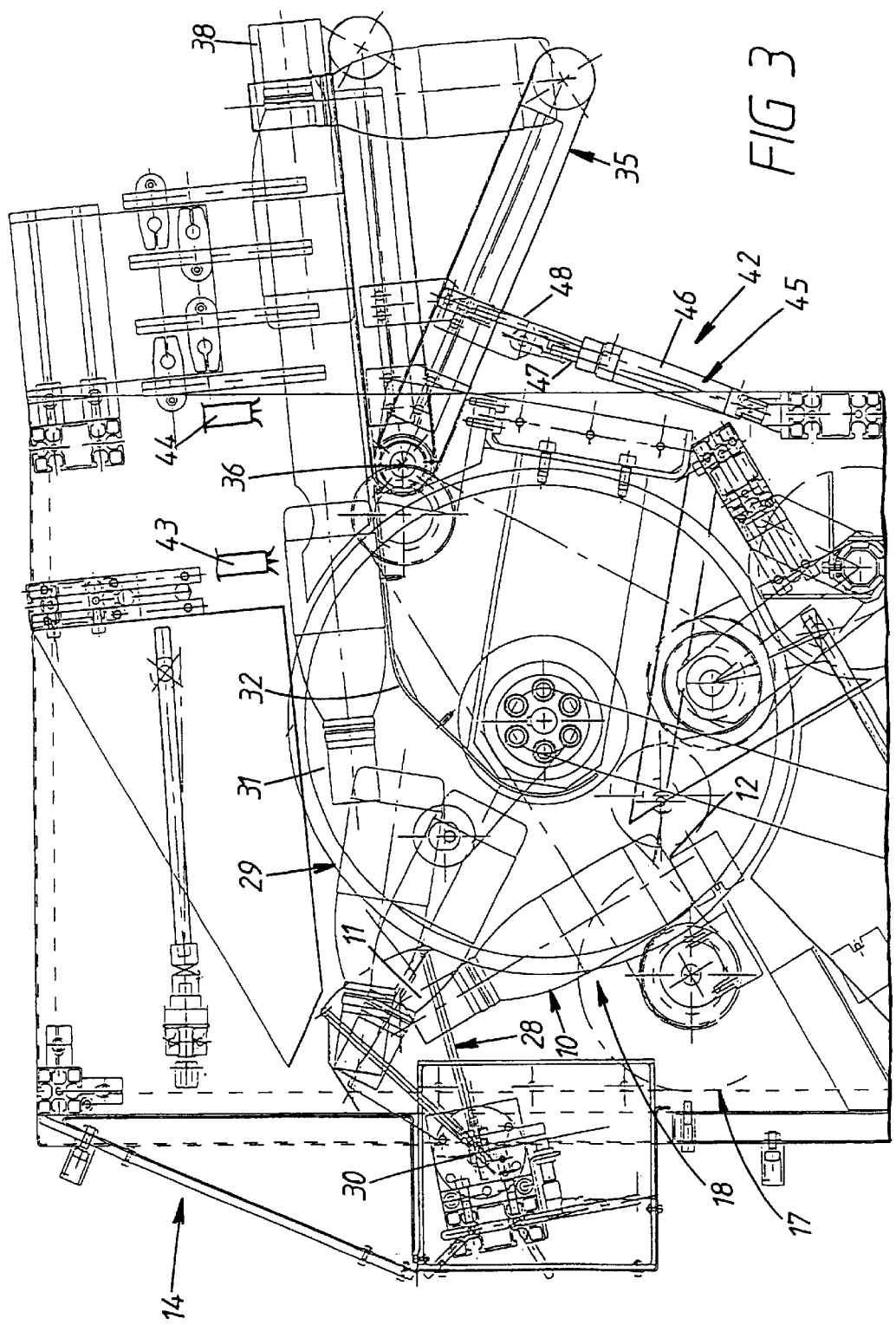
FIG. 3 shows the detail III from FIG. 1 to a larger scale.

For example, six such take-up corridors 16 are provided, as shown diagrammatically in FIG. 2.

The take-up corridors 16 and the selective turning devices 18 are well known per se and as they are not relevant to the present invention they will not be described in complete detail here.

Regarding firstly the take-up corridors 16, suffice to say that each of them is formed between two parallel flanges 20, 21 reciprocated vertically in the feed hopper 15 by a motor 23 through a crank 24 and links 25 and has, between the two flanges 20, 21, a bottom 26 extending obliquely toward the associated take-up conveyor 17 and which can take the form of a simple metal plate, for example.

The objects 10 are progressively oriented longitudinally by the flanges 20, 21, after which they are taken up by the take-up conveyors 17 with one or other of two possible longitudinal orientations, namely a first one in which the neck 11 is at the front and a second one in which the bottom 12 is at the front.

The take-up conveyors 17 are in practice slatted endless conveyors and extend from the bottom of the feed hopper 15 to the immediate vicinity of the selective turning devices 18.

The various take-up conveyors 17 of the distribution apparatus 14 are driven by appropriate drive means.

As shown here, for example, the drive means can be the motor 23 driving the flanges 20, 21.

However, a separate motor can be provided, if required.

Turning now to the selective turning devices 18, suffice to say that each of them includes a ring 28 the aperture in which is larger than the diameter of the neck 11 of the objects 10 but smaller than the diameter of their bottom 12 and a rotatable wheel 29 substantially tangential to the corresponding take-up conveyor 17.

The ring 28 is aligned with the take-up conveyor 17 and pivots about an axis 30 perpendicular to the lengthwise direction of the conveyor.

Return means, not shown in the figures, urge it at all times toward the take-up conveyor 17.

The wheel 29 is formed of two parallel disks 31 with the take-up conveyor 17 and a bottom 32 between them.

The disks 31 are rotated by a motor 33 via a transmission 34.

When they reach a selective turning device 18 of the above kind the objects 10 to be oriented are taken up and driven by the disks 31 of the wheel 29, the distance between which is chosen accordingly.

Two situations then arise.

Either the object 10 has its neck 11 at the front, as shown in FIG. 1, or it has its bottom 12 at the front.

In the first case the neck 11 of the object 10 is engaged in the ring 28 and temporarily pivots the ring as it is pivoted about the ring 28 due to the effect of it being driven by the disks 31 of the wheel 29, as a result of which it finally takes up a position on the associated take-off conveyor 19 with the bottom 12 at the front.

In the second case the object 10 moves directly to the take-off conveyor 19 with the bottom 12 at the front.

For a more detailed description of the take-up corridors 16 see U.S. Pat. No. 3,776,346 mentioned above, for example, and for a more detailed description of the selective turning devices 18 see GB patent 1,403,182, for example.

Only the elements of the invention necessary to understanding it are described hereinafter.

In accordance with the invention, a retractable selection conveyor 35 is provided between the selective turning device 18 and the take-off conveyor 19 associated with a take-up corridor 16 and in practice this applies to each of the take-up corridors 16.

Figure 4:
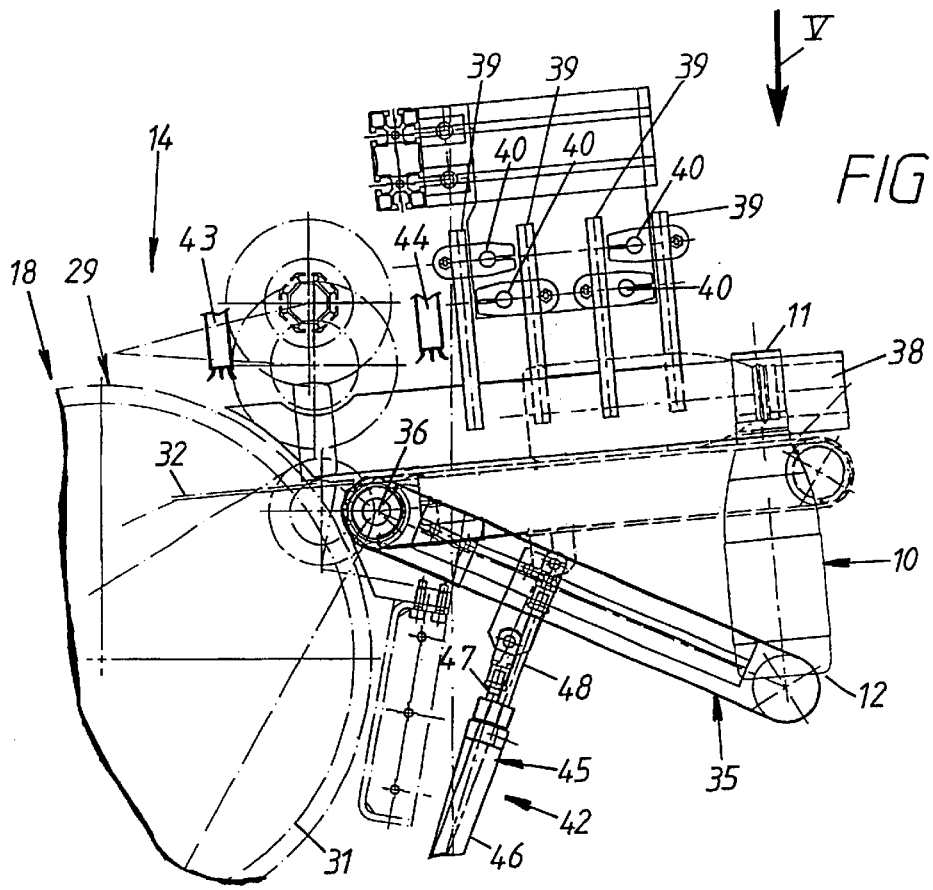
FIG. 4 is a view derived from that of FIG. 3 and relating more precisely to the selection conveyor of the invention.

In practice, the selection conveyor 35 moves between a service position in which it is continuous with the associated take-off conveyor 19, as shown in chain-dotted line in FIG. 4, and an ejection position in which it interrupts feeding of the take-off conveyor 19, as shown in continuous line in FIG. 4.

In the embodiment shown, and for reasons that are not relevant to the present invention and so are not explained here, the take-off conveyor 19 is substantially horizontal.

To be more precise, it is slightly oblique to the horizontal, rising in the direction away from the corresponding selective turning device 18.

When it is in its service position, the selection conveyor 35 of the invention provides the necessary continuity between the bottom 32 of the wheel 29 of the selective turning device 18 and the take-off conveyor 19.

Like the latter, it is then substantially horizontal, rising slightly in the direction away from the selective turning device 18.

In the embodiment shown, the selection conveyor 35 of the invention pivots about a transverse axis 36.

To be more precise, in this embodiment, the selection conveyor 35 pivots at the end at the greater distance from the take-up conveyor 19, which is the end at which it adjoins the selective turning device 18.

In practice, the selection conveyor 35 is an endless conveyor, that is to say a conveyor formed by an endless belt moving around two pulleys, one of which is motorized.

Also in practice, the transverse axis 36 about which it pivots is the rotation axis of its drive pulley.

As in the embodiment shown, the selection conveyor 35 of the invention is preferably vertically aligned with the feed hopper 15 and directed toward it in its ejection position.

In practice, in the ejection position, and as shown, the selection conveyor 35 of the invention is sharply oblique to the horizontal, descending in the direction away from the associated selective turning device 18.

In order to guide the objects 10 when it is in its service position, the selection conveyor 35 in the embodiment of the invention shown here is between flanges 38 coupled to suspension members 39 whose position on a cross-member 40 carrying them is adjustable to adjust the distance between the flanges 38 to suit the diameter of the objects 10.

Figure 5:
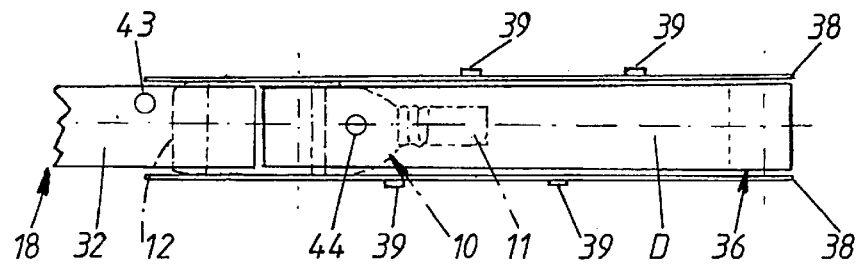
FIG. 5 is a plan view of the selection conveyor as seen in the direction of the arrow V in FIG. 4.

Actuator means 42 are provided for moving the selection conveyor 35 of the invention from its service position to its ejection position and are controlled by two sensors 43, 44 which are longitudinally spaced from each other between the selective turning device 18 and the take-off conveyor 19. Both are responsive to the movement of the objects 10 to be distributed and one of them, in this instance the more downstream sensor 44, is disposed substantially on the axis of displacement D of the objects 10 while the other one, in this instance the more upstream sensor 43, is spaced from the axis of displacement D, as seen in FIG. 5 in particular.

The sensors 43, 44 are simple photoelectric cells, for example.

In the embodiment shown, the sensor 43 is in line with the bottom 32 of the wheel 29 of the selective turning device 18, slightly upstream of its exit, and the sensor 44 is in line with the selection conveyor 35, slightly downstream of its entry.

Of course, their position is adjustable both longitudinally and transversely to suit the objects 10 to be oriented.

In the embodiment shown, the actuator means 42 of the selection conveyor 35 of the invention include a jack 45 articulated to the selection conveyor 35.

To be more precise, the body 46 of the jack 45 is articulated to the frame of the assembly and its piston rod 47 is articulated to a flange 48 to which the selection conveyor 35 is attached.

As in the embodiment shown, the actuator means 42 of the selection conveyor 35 of the invention are preferably also under the control of a sensor 49 which is vertically aligned with the take-off conveyor 19 and is also responsive to the movement of the objects 10 to be distributed.

As shown here, for example, this sensor 49 is near the entry of the take-off conveyor 19.

The selection conveyor 35 of the invention of each take-up corridor 16 is normally in its service position.

Because of the operation of the corresponding selective turning device 18, as briefly explained above, the objects 10 to be distributed normally all reach the entry of the selection conveyor 35 with the bottom 12 at the front.

However, if a malfunction of the selective turning device 18 causes an object 10 to reach the selection conveyor 35 the other way round, with the neck 11 at the front, as shown in the figures, the beam from the more upstream sensor 43 is abnormally intercepted by the object 10 relative to the more downstream sensor 44 and the actuator means 42 of the selection conveyor 35 are operated accordingly, to move the selection conveyor 35 from its service position to its ejection position.

The incorrectly oriented object 10 is therefore ejected toward the feed hopper 15.

Similarly, if an object 10 stops at the location of the sensor 49 because of temporary congestion, the actuator means 42 are operated to move the selection conveyor 35 of the invention to its ejection position, as previously, so that further objects 10 reaching it are diverted to the feed hopper 15.

Because of this arrangement, the various take-up conveyors 17 of the distribution apparatus 14 can if required be driven directly by drive means common to all of them, without individual clutch means between any of them and the drive means, because it is no longer necessary to stop them if the corresponding take-off conveyor 19 is congested in this way.

Of course, the present invention is not limited to the embodiment described and shown but encompasses any variant execution thereof.

There is claimed:

1. Apparatus for distributing objects to be oriented longitudinally one way round, including a feed hopper adapted to receive the objects to be distributed loose, at least one take-up corridor that dips into said feed hopper, a longitudinal take-up conveyor in said take-up corridor adapted to drive said objects, a selective turning device adapted to allow said objects to pass through it when they are a first way round and to turn them when they are a second, opposite way round, a take-off conveyor fed by said selective turning device and a retractable endless selection conveyor between said selective turning device and said take-off conveyor, said selection conveyor being mounted for movement between a service position in which it is continuous with said take-off conveyor and an ejection position in which it interrupts feeding of said take-off conveyor.

2. The distribution apparatus claimed in claim 1 wherein said actuator means for said selection conveyor are also controlled by a sensor vertically aligned with said take-off conveyor.

3. The distribution apparatus claimed in claim 1 wherein said selection conveyor is vertically aligned with said feed hopper and directed toward it in its ejection position.

4. The distribution apparatus claimed in claim 1 wherein said take-off conveyor is substantially horizontal.

5. The distribution apparatus claimed in claim 1 wherein said selection conveyor pivots about a transverse axis.

6. The distribution apparatus claimed in claim 5 wherein said selection conveyor pivots at the end at the greater distance from said take-off conveyor.

7. The distribution apparatus claimed in claim 1 including actuator means for moving said selection conveyor from its service position to its ejection position controlled by two sensors longitudinally spaced from each other between said selective turning device and said take-off conveyor, both of which are responsive to the movement of said objects to be distributed, one of which is disposed substantially on an axis of displacement of said objects and the other of which is spaced from that axis.

8. The distribution apparatus claimed in claim 7 wherein said actuator means for said selection conveyor include a jack articulated to said selection conveyor.

9. The distribution apparatus claimed in claim 1 including a plurality of take-up corridors side-by-side and each having a take-up conveyor, a selective turning device, a selection conveyor and a take-off conveyor.

10. The distribution apparatus claimed in claim 9 wherein said take-up conveyors are directly driven by drive means common to all of them without individual clutch means between any of them and said drive means.

* * * * *